United States Patent
Jain et al.

(10) Patent No.: US 11,129,103 B2
(45) Date of Patent: Sep. 21, 2021

(54) SKIPPING PERIODIC MEASUREMENTS TO ENABLE POWER SAVING IN USER EQUIPMENTS

(71) Applicant: QUALCOMM Incorporated, San Diego, CA (US)

(72) Inventors: Chhavi Jain, San Diego, CA (US); Baris Efe, San Diego, CA (US); Yong Li, San Diego, CA (US); Raghu Challa, San Diego, CA (US); Chun-Hao Hsu, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/354,087

(22) Filed: Mar. 14, 2019

(65) Prior Publication Data
US 2019/0289552 A1  Sep. 19, 2019

Related U.S. Application Data

(60) Provisional application No. 62/643,706, filed on Mar. 15, 2018.

(51) Int. Cl.
*H04W 52/02* (2009.01)
*H04W 24/10* (2009.01)
(Continued)

(52) U.S. Cl.
CPC ...... *H04W 52/0235* (2013.01); *H04B 7/0626* (2013.01); *H04B 7/0632* (2013.01);
(Continued)

(58) Field of Classification Search
CPC ....... H04W 24/10; H04B 17/24; H04B 17/26; H04B 17/318; H04B 17/327
See application file for complete search history.

(56) References Cited

U.S. PATENT DOCUMENTS

| 6,385,460 | B1 * | 5/2002 | Wan | .................. | H04W 52/0254 |
| | | | | | 455/515 |
| 6,526,286 | B2 * | 2/2003 | Wan | .................. | H04W 52/0254 |
| | | | | | 455/515 |

(Continued)

FOREIGN PATENT DOCUMENTS

| CN | 103460762 A | * | 12/2013 | ............ H04W 24/10 |
| CN | 105027636 A | * | 11/2015 | ........ H04W 36/0088 |

(Continued)

OTHER PUBLICATIONS

Samsung, On UE Power Savings, Mar. 2, 2018, 3GPP, 3GPP TSG RAN WG1 Meeting #92, Tdoc: R1-1801977 (Year: 2018).*

(Continued)

*Primary Examiner* — Eric Nowlin
(74) *Attorney, Agent, or Firm* — Qualcomm Incorporated

(57) ABSTRACT

Aspects of the present disclosure provide techniques and apparatus for wireless communication. In one aspect, a method is provided which may be performed by a wireless device such as a user equipment (UE). The method generally includes: identifying at least one indicator to conserve power; and in response to the identification, determining to skip one or more periodic or semi-persistent measurements of a signal from a cell based on at least one criteria.

22 Claims, 11 Drawing Sheets

(51) Int. Cl.
- *H04B 7/06* (2006.01)
- *H04L 1/00* (2006.01)
- *H04W 56/00* (2009.01)

(52) U.S. Cl.
CPC ......... *H04B 7/0639* (2013.01); *H04L 1/0026* (2013.01); *H04W 24/10* (2013.01); *H04W 52/0261* (2013.01); *H04W 52/0245* (2013.01); *H04W 56/0015* (2013.01)

(56) References Cited

U.S. PATENT DOCUMENTS

| | | | | |
|---|---|---|---|---|
| 7,484,110 | B2* | 1/2009 | Stufflebeam | G06F 1/3203 713/300 |
| 7,817,964 | B2* | 10/2010 | Patel | H04W 24/10 370/328 |
| 8,391,862 | B1* | 3/2013 | Harju | H04W 48/16 370/350 |
| 8,451,803 | B2* | 5/2013 | Kitazoe | H04W 36/0088 370/332 |
| 8,849,215 | B2* | 9/2014 | Edara | H04W 76/28 455/67.11 |
| 9,049,657 | B2* | 6/2015 | Boley | H04W 52/0212 |
| 9,319,985 | B2* | 4/2016 | Vangala | H04W 36/0085 |
| 9,363,717 | B2* | 6/2016 | Xuan | H04W 36/0088 |
| 9,479,955 | B2* | 10/2016 | Vargas Bautista | H04W 36/0094 |
| 9,480,071 | B2* | 10/2016 | Krishnamoorthy | H04W 24/08 |
| 9,549,359 | B2* | 1/2017 | Vangala | H04W 36/0085 |
| 9,723,507 | B2* | 8/2017 | Edara | H04W 76/28 |
| 9,813,965 | B1* | 11/2017 | Edara | H04W 36/30 |
| 9,980,225 | B2* | 5/2018 | Damji | H04W 52/0225 |
| 10,098,016 | B2* | 10/2018 | Wang | H04W 24/02 |
| 10,284,155 | B2* | 5/2019 | Reial | H04B 17/382 |
| 2002/0147024 | A1* | 10/2002 | Wan | H04W 52/0254 455/515 |
| 2004/0180701 | A1* | 9/2004 | Livet | H04W 52/0261 455/574 |
| 2007/0220291 | A1* | 9/2007 | Stufflebeam | G06F 1/3203 713/320 |
| 2009/0005119 | A1* | 1/2009 | Patel | H04W 24/10 455/562.1 |
| 2012/0252368 | A1* | 10/2012 | Edara | H04W 36/0088 455/67.11 |
| 2013/0122918 | A1* | 5/2013 | Boley | H04W 52/0212 455/450 |
| 2013/0258883 | A1* | 10/2013 | Vargas Bautista | H04W 24/10 370/252 |
| 2014/0200002 | A1* | 7/2014 | Vangala | H04W 24/10 455/436 |
| 2014/0355473 | A1* | 12/2014 | Edara | H04W 24/10 370/252 |
| 2014/0378142 | A1* | 12/2014 | Xuan | H04W 36/0088 455/437 |
| 2015/0131461 | A1 | 5/2015 | Ramkumar et al. | |
| 2015/0163745 | A1 | 6/2015 | Kim et al. | |
| 2015/0296401 | A1* | 10/2015 | Hamilton | H04W 24/10 370/252 |
| 2016/0029314 | A1* | 1/2016 | Damji | H04W 36/00835 370/252 |
| 2016/0174232 | A1* | 6/2016 | Krishnamoorthy | H04B 1/1027 455/436 |
| 2016/0198386 | A1* | 7/2016 | Vangala | H04W 24/10 455/436 |
| 2016/0219440 | A1* | 7/2016 | Wang | H04W 24/02 |
| 2017/0223667 | A1 | 8/2017 | Yi et al. | |
| 2017/0311266 | A1 | 10/2017 | Yang et al. | |
| 2018/0083722 | A1* | 3/2018 | Reial | H04W 24/08 |
| 2019/0069192 | A1* | 2/2019 | Palenius | H04W 76/10 |
| 2019/0074887 | A1* | 3/2019 | Yiu | H04B 17/327 |
| 2019/0158345 | A1* | 5/2019 | Lincoln | H04J 11/0059 |
| 2019/0215710 | A1* | 7/2019 | Yi | H04B 1/713 |
| 2019/0297577 | A1* | 9/2019 | Lin | H04W 52/0219 |
| 2020/0351790 | A1* | 11/2020 | Hsieh | H04W 52/0245 |
| 2020/0359247 | A1* | 11/2020 | Yi | H04L 5/0048 |
| 2021/0058913 | A1* | 2/2021 | Jang | H04W 76/28 |

FOREIGN PATENT DOCUMENTS

| | | | | |
|---|---|---|---|---|
| EP | 2692177 A1 | * | 2/2014 | ........ H04W 36/0088 |
| EP | 2944129 A1 | * | 11/2015 | ........ H04W 36/0061 |
| EP | 2944129 A4 | * | 8/2016 | ........ H04W 52/0254 |
| JP | 5769870 B2 | * | 8/2015 | ............ H04W 24/10 |
| KR | 20150097621 A | * | 8/2015 | ........ H04W 36/0061 |
| KR | 101701079 B1 | * | 1/2017 | ........ H04W 52/0225 |
| WO | WO-9962285 A1 | * | 12/1999 | ........ H04W 52/0254 |
| WO | WO-2014062029 A1 | * | 4/2014 | ............ H04W 24/10 |
| WO | WO-2014110321 A1 | * | 7/2014 | ............ H04W 36/32 |

OTHER PUBLICATIONS

Huawei et al., Power consumption reduction in RRM measurements, Mar. 1, 2019, 3GPP, 3GPP TSG RAN WG1 Meeting #96, Tdoc: R1-1901573 (Year: 2019).*

Vivo, UE adaptation to traffic and power consumption characteristics, Mar. 1, 2019, 3GPP, 3GPP TSG RAN WG1 #96, Tdoc: R1-1901710 (Year: 2019).*

Vivo, Triggering adaptation of UE power consumption characteristics, Mar. 1, 2019, 3GPP, 3GPP TSG RAN WG1#96, Tdoc: R1-1901713 (Year: 2019).*

ZTE, On UE Power Saving for RRM Measurement, Mar. 1, 2019, 3GPP, 3GPP TSG RAN WG1 Meeting #96, Tdoc: R1-1902032 (Year: 2019).*

LG Electronics, Discussion on UE power consumption reduction in RRM measurements, Mar. 1, 2019, 3GPP, 3GPP TSG RAN WG1 #96, Tdoc: R1-1902054 (Year: 2019).*

Sony, Reduction in RRM measurements for UE power saving, Mar. 1, 2019, 3GPP, 3GPP TSG RAN WG1 #96, Tdoc: R1-1902187 (Year: 2019).*

Samsung, UE power consumption reduction in RRM measurement, Mar. 1, 2019, 3GPP, 3GPP TSG RAN WG1 Meeting #96, Tdoc: R1-1902319 (Year: 2019).*

NTT Docomo, Inc., Discussion on UE power Consumption Reduction in RRM Measurements, Mar. 1, 2019, 3GPP, 3GPP TSG RAN WG1 #96, Tdoc: R1-1902816 (Year: 2019).*

CATT et al., New SID: Study on UE Power Saving in NR, Jun. 14, 2018, 3GPP, 3GPP TSG RAN Meetings #80, Tdoc: RP-181463 (Year: 2018).*

International Search Report and Written Opinion—PCT/US2019/022631—ISA/EPO—dated May 6, 2019.

Qualcomm Incorporated: UE Power Consumption Reduction in RRM Measurements, 3GPP Draft, R1-1903017 UE Power Consumption Reduction in RRM Measurements, 3rd Generation Partnership Project {3GPP}, Mobile Competence Centre , 650, Route Des Lucioles , F-06921 Sophia-Antipolis Cede, vol. RAN WGI, No. Athens, Greece, Feb. 25, 2019-Mar. 1, 2019, Feb. 16, 2019 {Feb. 16, 2019), XP051600714, 20 Pages, Retrieved from the Internet: URL:http://www.3gpp.org/ftp/tsg%5Fran/WG1%5FRL1/TSGR1%5F96/Docs/R1%2D1903017%2Ezip [retrieved on Feb. 16, 2019].

* cited by examiner

SKIPPING PERIODIC MEASUREMENTS TO ENABLE POWER SAVING IN USER EQUIPMENTS

CROSS REFERENCE TO RELATED APPLICATIONS

This application for patent claims priority to U.S. provisional application No. 62/643,706, filed Mar. 15, 2018, which is hereby incorporated by reference in its entirety.

FIELD

Certain aspects of the present disclosure generally relate to wireless communications and, more particularly, to skipping periodic measurements to enable power saving in user equipments (UEs).

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced (LTE-A) systems/5G New Radio (NR) systems and orthogonal frequency division multiple access (OFDMA) systems.

Generally, a wireless multiple-access communication system can simultaneously support communication for multiple wireless terminals. Each terminal communicates with one or more base stations (BSs) via transmissions on the forward and reverse links. The forward link (or downlink) refers to the communication link from the BSs to the terminals, and the reverse link (or uplink) refers to the communication link from the terminals to the BSs. This communication link may be established via a single-input single-output, multiple-input single-output or a multiple-input multiple-output (MIMO) system.

A wireless communication network may include a number of BSs that can support communication for a number of wireless devices. Wireless devices may include user equipments (UEs). Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Wireless devices may include Internet-of-Things (IoT) devices (e.g., narrowband IoT (NB-IoT) devices). IoT may refer to a network of physical objects, devices, or "things". IoT devices may be embedded with, for example, electronics, software, or sensors and may have network connectivity, which enable these devices to collect and exchange data.

Some next generation, New Radio (NR), or 5G networks may include a number of base stations, each simultaneously supporting communication for multiple communication devices, such as UEs. In LTE or LTE-A network, a set of one or more BSs may define an e NodeB (eNB). In other examples (e.g., in a next generation or 5G network), a wireless multiple access communication system may include a number of distributed units (e.g., edge units (EUs), edge nodes (ENs), radio heads (RHs), smart radio heads (SRHs), transmission reception points (TRPs), etc.) in communication with a number of central units (e.g., CU, central nodes (CNs), access node controllers (ANCs), etc.), where a set of one or more distributed units (DUs), in communication with a CU, may define an access node (e.g., AN, a new radio base station (NR BS), a NR NB, a network node, a gNB, a 5G BS, an access point (AP), etc.). A BS or DU may communicate with a set of UEs on downlink channels (e.g., for transmissions from a BS or to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. NR (e.g., 5G radio access) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, MIMO antenna technology, and carrier aggregation.

However, as the demand for mobile broadband access continues to increase, there exists a need for further improvements in LTE, MTC, IoT, and NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "DETAILED DESCRIPTION" one will understand how the features of this disclosure provide advantages that include improved communications between access points and stations in a wireless network.

Certain aspects of the present disclosure generally relate to UE power management techniques.

Certain aspects of the present disclosure provide a method, performed by a wireless device, such as a user equipment (UE). The method generally includes: identifying at least one indicator to conserve power; and in response to the identification, determining to skip one or more periodic or semi-persistent measurements of a signal from a cell based on at least one criteria.

Certain aspects of the present disclosure provide for an apparatus. The apparatus generally includes at least one processor configured to: identify at least one indicator to conserve power; and determine, in response to the identification, to skip one or more periodic or semi-persistent measurements of a signal from a cell based on at least one criteria; and a memory coupled to the at least one processor.

Certain aspects of the present disclosure provide for an apparatus. The apparatus generally includes: means for identifying at least one indicator to conserve power; and means for determining, in response to the identification, to skip one or more periodic or semi-persistent measurements of a signal from a cell based on at least one criteria.

Certain aspects of the present disclosure provide for a computer-readable medium. The computer-readable medium generally includes code, which when executed by at least one processor, causes the at least one processor to: identify at least one indicator to conserve power; and determine, in response to the identification, to skip one or more periodic or semi-persistent measurements of a signal from a cell based on at least one criteria.

Numerous other aspects are provided including methods, apparatus, systems, computer program products, computer-readable medium, and processing systems. To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide techniques for UE power management. The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMP), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR (e.g., 5G radio access) is an example of an emerging telecommunication standard. NR is a set of enhancements to the LTE mobile standard promulgated by 3GPP. The techniques described herein may be used for the wireless networks and radio technologies mentioned above as well as other wireless networks and radio technologies. For clarity, certain aspects of the techniques are described below for LTE/LTE-Advanced, and LTE/LTE-Advanced (LTE-A) terminology is used in much of the description below. LTE and LTE-A are referred to generally as LTE. Depending on the context, "channel" may refer to the channel on which signaling/data/information is transmitted or received, or to the signaling/data/information that is transmitted or received on the channel.

It is noted that while aspects may be described herein using terminology commonly associated with 3G and/or 4G wireless technologies, aspects of the present disclosure can be applied in other generation-based communication systems, such as 5G and later.

Example Wireless Communications Network

Figure 1:
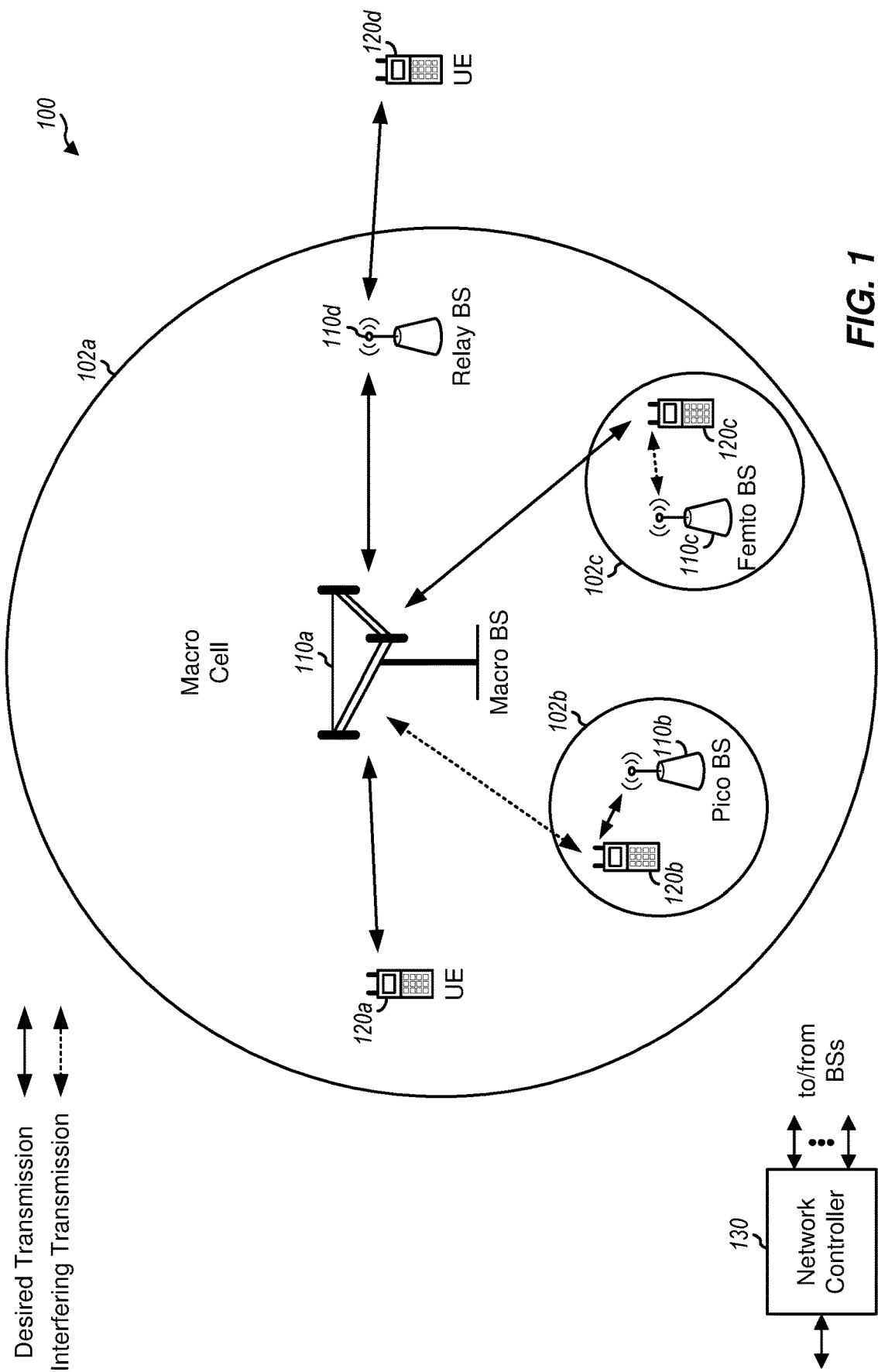
FIG. 1 is a block diagram conceptually illustrating an example of a wireless communication network, in accordance with certain aspects of the present disclosure.

FIG. 1 illustrates an example wireless communication network 100, in which aspects of the present disclosure may be practiced. For example, techniques presented herein may be used for cell CE level determination in wireless communication network 100, which may be an LTE or later network that includes narrowband Internet-of-things (NB-IoT) and/or enhanced/evolved machine type communications (eMTC) devices. Wireless communication network 100 may include base stations (BSs) 110 and user equipment (UEs) 120. In aspects, a BS 110 can determine at least one narrowband region of a wideband region for communication with a UE 120. UE 120, which may be a low cost device, such a NB-IoT device or an eMTC UE, can determine the narrowband region and receive, send, monitor, or decode information on the narrowband region for communication with BS 110.

Wireless communication network 100 may be a long term evolution (LTE) network or some other wireless network, such as a new radio (NR) or 5G network. Wireless communication network 100 may include a number of BSs 110 and other network entities. A BS is an entity that communicates with UEs and may also be referred to as a NR BS, a Node B (NB), an evolved/enhanced NB (eNB), a 5G NB, a gNB, an access point (AP), a transmission reception point (TRP), etc. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, BS 110a may be a macro BS for a macro cell 102a, BS 110b may be a pico BS for a pico cell 102b, and BS 110c may be a femto BS for a femto cell 102c. A BS may support one or multiple (e.g., three) cells.

Wireless communication network 100 may also include relay stations. A relay station is an entity that can receive a transmission of data from an upstream station (e.g., BS 110 or UE 120) and send a transmission of the data to a downstream station (e.g., UE 120 or BS 110). A relay station may also be a UE that can relay transmissions for other UEs. In the example shown in FIG. 1, relay station 110d may communicate with macro BS 110a and UE 120d in order to facilitate communication between BS 110a and UE 120d. A relay station may also be referred to as a relay BS, a relay, etc.

Wireless communication network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless communication network 100. For example, macro BSs may have a high transmit power level (e.g., 5 to 40 Watts) whereas pico BSs, femto BSs, and relay BSs may have lower transmit power levels (e.g., 0.1 to 2 Watts).

Network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., UE 120a, UE 120b, UE 120c) may be dispersed throughout wireless communication network 100, and each UE may be stationary or mobile. A UE may also be referred to as an access terminal, a terminal, a mobile station, a subscriber unit, a station, a Customer Premises Equipment (CPE), etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a drone, a robot/robotic device, a netbook, a smartbook, an ultrabook, a medical device, medical equipment, a healthcare device, a biometric sensor/device, a wearable device such as a smart watch, smart clothing, smart glasses, virtual reality goggles, a smart wristband, and/or smart jewelry (e.g., a smart ring, a smart bracelet, etc.), an entertainment device (e.g., a music device, a video device, a gaming device, a satellite radio, etc.), industrial manufacturing equipment, a navigation/positioning device (e.g., GNSS (global navigation satellite system) devices based on, for example, GPS (global positioning system), Beidou, GLONASS, Galileo, terrestrial-based devices, etc.), or any other suitable device configured to communicate via a wireless or wired medium. Some UEs may be implemented as IoT (Internet of things) UEs. IoT UEs include, for example, robots/robotic devices, drones, remote devices, sensors, meters, monitors, cameras, location tags, etc., that may communicate with a BS, another device (e.g., remote device), or some other entity. IoT UEs may include MTC/eMTC UEs, NB-IoT UEs, as well as other types of UEs. A wireless node may provide, for example, connectivity for or to a network (e.g., a wide area network such as Internet or a cellular network) via a wired or wireless communication link.

One or more UEs 120 in the wireless communication network 100 (e.g., an LTE network) may be a narrowband bandwidth UE. As used herein, devices with limited communication resources, e.g. smaller bandwidth, may be referred to generally as narrowband (NB) UEs or bandwidth limited (BL) UEs. In one example, a limited bandwidth may be 1.4 MHz. In another example, a limited bandwidth may be 5 MHz. Similarly, legacy devices, such as legacy and/or advanced UEs (e.g., in LTE) may be referred to generally as wideband UEs. Generally, wideband UEs are capable of operating on a larger amount of bandwidth than narrowband UEs.

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a BS 110) allocates resources for communication among some or all devices and equipment within its service area or cell. The scheduling entity may be responsible for scheduling, assigning, reconfiguring, and releasing resources for one or more subordinate entities. For scheduled communication, subordinate entities utilize resources allocated by the scheduling entity. BSs 110 are not the only entities that may function as a scheduling entity. In some examples, UE 120 may function as a scheduling entity, scheduling resources for one or more subordinate entities (e.g., one or more other UEs 120). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 2:
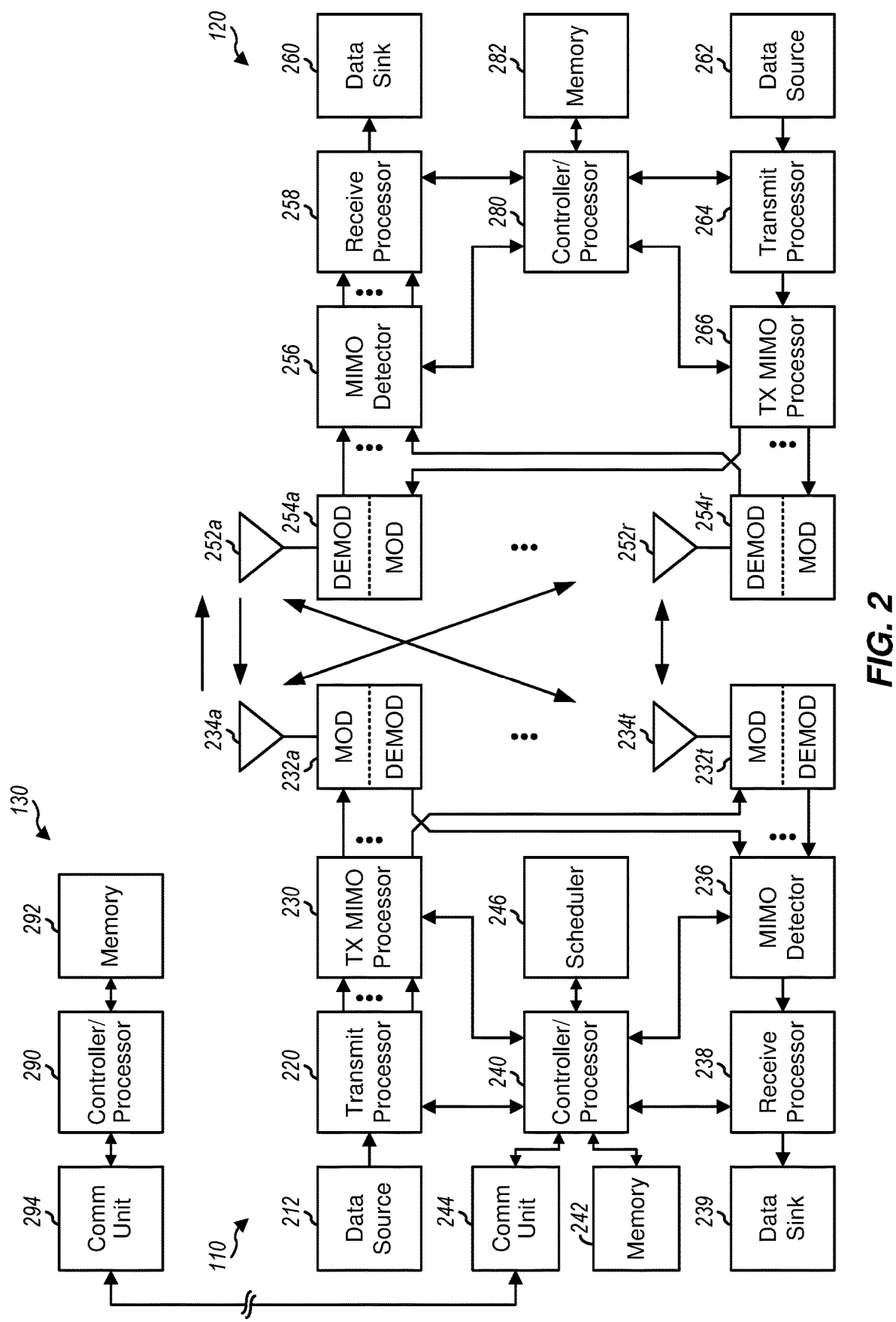
FIG. 2 shows a block diagram conceptually illustrating an example of a base station (BS) in communication with a user equipment (UE) in a wireless communications network, in accordance with certain aspects of the present disclosure.

FIG. 2 shows a block diagram of a design of BS 110 and UE 120, which may be one of the BSs 110 and one of the UEs 120 in FIG. 1. BS 110 may be equipped with T antennas 234a through 234t, and UE 120 may be equipped with R antennas 252a through 252r, where in general T≥1 and R≥1.

At BS 110, transmit processor 220 may receive data from a data source 212 for one or more UEs, select one or more modulation and coding schemes (MCS) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for static resource partitioning information (SRPI), etc.) and control information (e.g., CQI requests, grants, upper layer signaling, etc.) and provide overhead symbols and control symbols. Processor 220 may also generate reference symbols for reference signals (e.g., the cell-specific reference signal (CRS)) and synchronization signals (e.g., the primary synchronization signal (PSS) and the secondary synchronization signal (SSS)). Transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other BSs and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. MIMO detector 256 may obtain received symbols from all R demodulators 254a through 254r, perform MIMO detection on the received symbols if applicable, and provide detected symbols. Receive processor 258 may process (e.g., demodulate and decode) the detected symbols, provide decoded data for UE 120 to data sink 260, and provide decoded control information and system information to controller/processor 280. A channel processor may determine reference signal received power (RSRP), received signal strength indicator (RSSI), reference signal received quality (RSRQ), CQI, etc.

On the uplink, at UE 120, transmit processor 264 may receive and process data from data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by TX MIMO processor 266 if applicable, further processed by modulators 254a through 254r (e.g., for SC-FDM, OFDM, etc.), and transmitted to BS 110. At BS 110, the uplink signals from UE 120 and other UEs may be received by antennas 234, processed by demodulators 232, detected by MIMO detector 236 if applicable, and further processed by receive processor 238 to obtain decoded data and control information sent by UE 120. Processor 238 may provide the decoded data to data sink 239 and the decoded control information to controller/processor 240. BS 110 may include communication unit 244 and communicate to network controller 130 via communication unit 244. Network controller 130 may include communication unit 294, controller/processor 290, and memory 292.

Controllers/processors 240 and 280 may direct the operation at BS 110 and UE 120, respectively, to perform techniques presented herein. For example, processor 240 and/or other processors and modules at BS 110, and processor 280 and/or other processors and modules at UE 120, may perform or direct operations of BS 110 and UE 120, respectively. For example, controller/processor 240 and/or other controllers/processors and modules at BS 110 may perform or direct operations of BS 110. For example, controller/processor 280 and/or other controllers/processors and modules at UE 120 may perform or direct operations 1200 shown in FIG. 12. Memories 242 and 282 may store data and program codes for BS 110 and UE 120, respectively. For example, controller/processor 280 at UE 120 may be configured to: identify at least one indicator to conserve power; and determine, in response to the identification, to skip one or more periodic or semi-persistent measurements of a signal from a cell based on at least one criteria; and memory 282 may be coupled to controller/processor 280. Scheduler 246 may schedule UEs for data transmission on the downlink and/or uplink.

Figure 3:
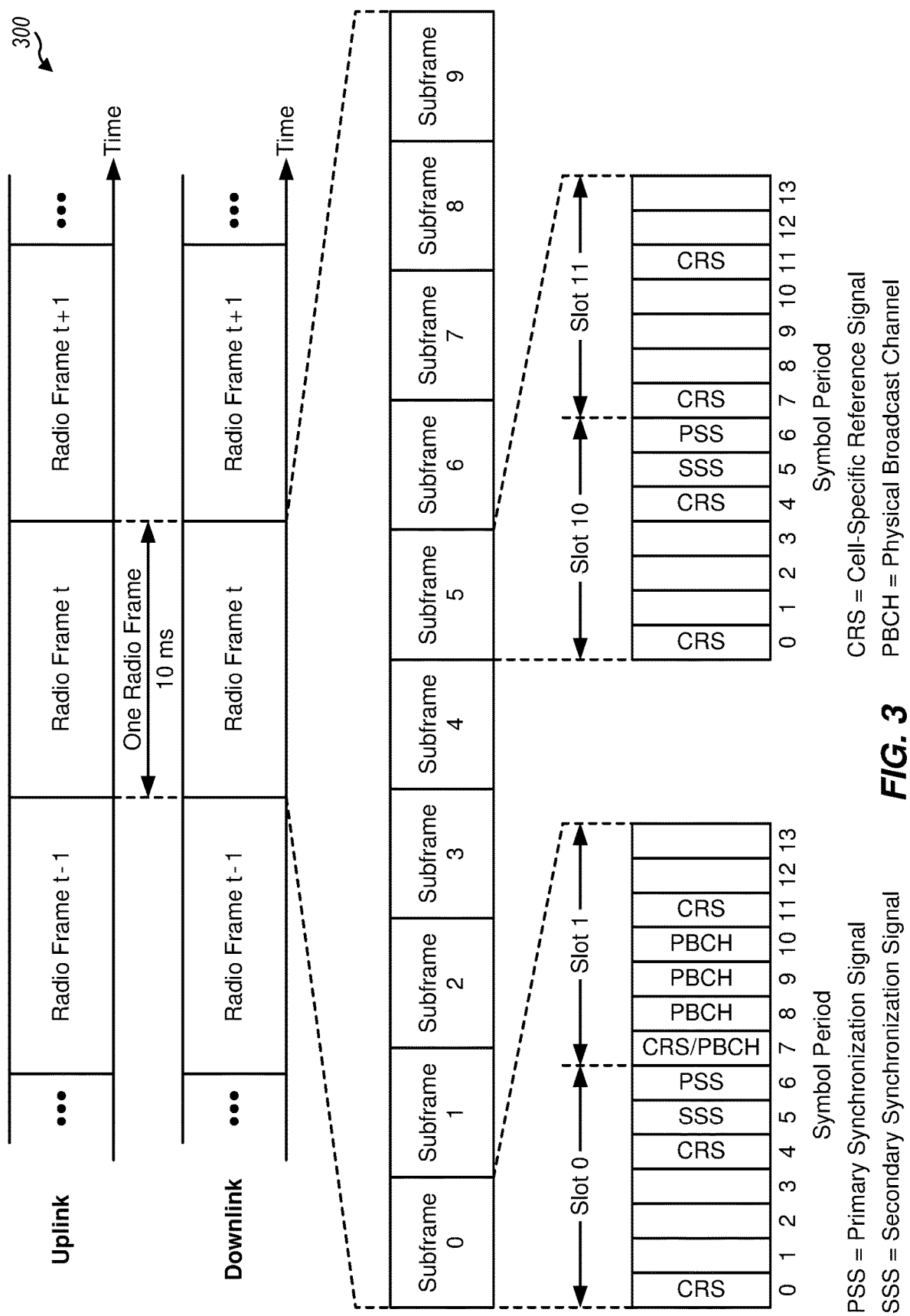
FIG. 3 is a block diagram conceptually illustrating an example of a frame structure in a wireless communications network, in accordance with certain aspects of the present disclosure.

FIG. 3 shows an exemplary frame structure 300 for frequency division duplexing (FDD) in a wireless communication system (e.g., such as wireless communication network 100). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, for example, seven symbol periods for a normal cyclic prefix (as shown in FIG. 3) or six symbol periods for an extended cyclic prefix. The 2L symbol periods in each subframe may be assigned indices of 0 through 2L−1.

In certain wireless communication systems (e.g., LTE), a BS (e.g., such as a BS 110) may transmit a PSS and a SSS on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs (e.g., such as UEs 120) for cell search and acquisition. The BS may transmit a CRS across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In certain systems (e.g., such as NR or 5G systems), a BS may transmit these or other signals in these locations or in different locations of the subframe.

Figure 4:
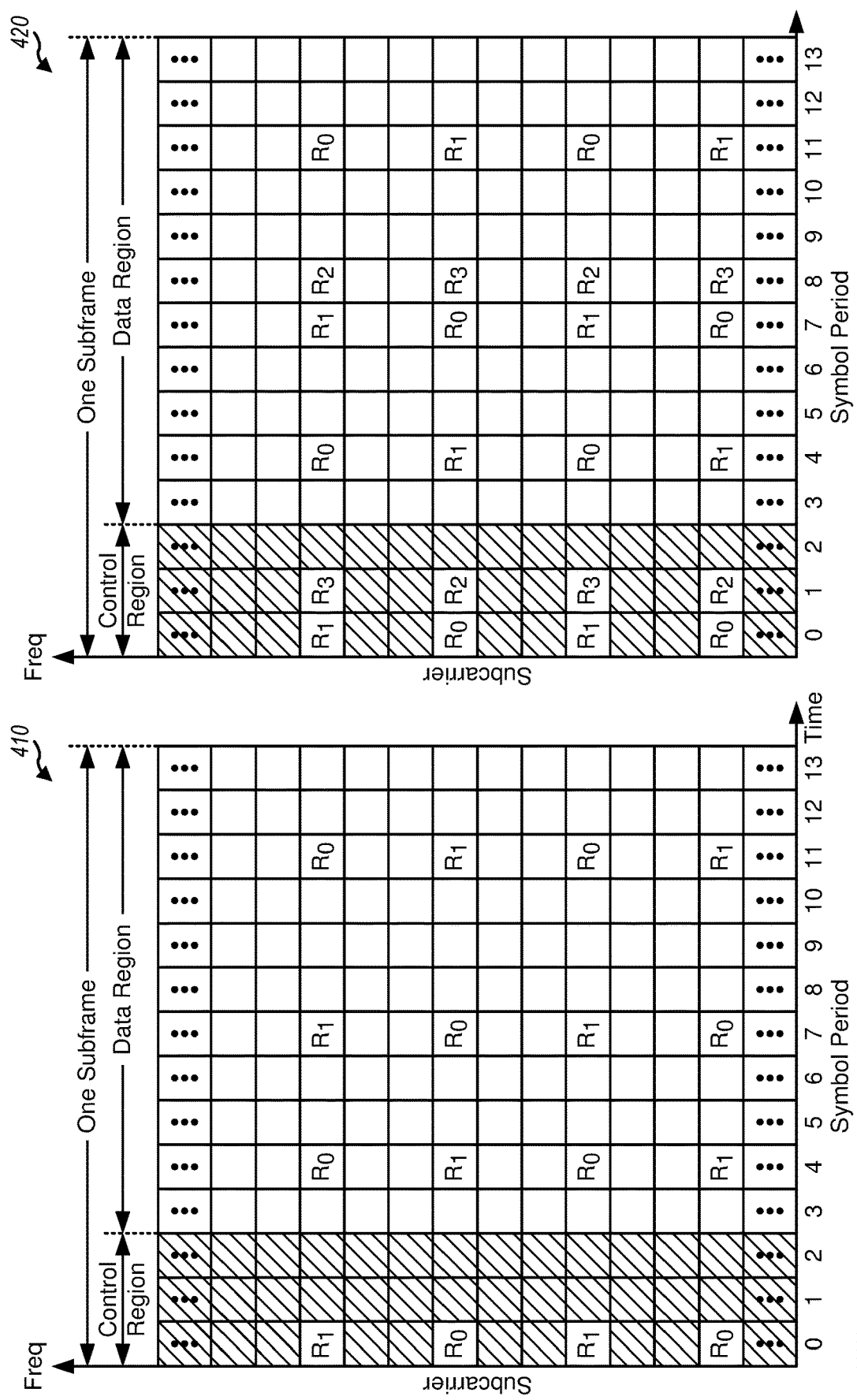
FIG. 4 is a block diagram conceptually illustrating two exemplary subframe formats with the normal cyclic prefix, in accordance with certain aspects of the present disclosure.

FIG. 4 shows two exemplary subframe formats 410 and 420 with the normal cyclic prefix. The available time frequency resources may be partitioned into resource blocks (RBs). Each RB may cover 12 subcarriers in one slot and may include a number of resource elements (REs). Each RE may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given RE with label Ra, a modulation symbol may be transmitted on that RE from antenna a, and no modulation symbols may be transmitted on that RE from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, REs not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BS. One of these BSs may be selected to serve the UE. The serving BS may be selected based on various criteria such as received signal strength, received signal quality, pathloss, etc. Received signal quality may be quantified by a signal-to-noise-and-interference ratio (SINR), or a RSRQ, or some other metric. The UE may operate in a dominant interference scenario in which the UE may observe high interference from one or more interfering BS.

The wireless communication network may support a 180 kHz deployment for narrowband operation (e.g., NB-IoT) with different deployment modes. In one example, narrowband operations may be deployed in-band, for example, using RBs within a wider system bandwidth. In one case, narrowband operations may use one RB within the wider system bandwidth of an existing network (e.g., such as an LTE network). In this case, the 180 kHz bandwidth for the RB may have to be aligned with a wideband RB. In one example, narrowband operations may be deployed in the unused RBs within a carrier guard-band (e.g., LTE). In this deployment, the 180 kHz RB within the guard band may be aligned with a 15 kHz tone grid of wideband LTE, for example, in order to use the same Fast Fourier Transform (FFT) and/or reduce interference in-band legacy LTE communications.

Example Narrowband Communications

The focus of traditional LTE design (e.g., for legacy "non MTC" devices) is on the improvement of spectral efficiency, ubiquitous coverage, and enhanced quality of service (QoS) support. Current LTE system downlink (DL) and uplink (UL) link budgets are designed for coverage of high end devices, such as state-of-the-art smartphones and tablets, which may support a relatively large DL and UL link budget.

However, as described above, one or more UEs in the wireless communication network (e.g., wireless communication network 100) may be devices that have limited communication resources, such as narrowband UEs, as compared to other (wideband) devices in the wireless communication network. For narrowband UEs, various requirements may be relaxed as only a limited amount of information may need to be exchanged. For example, maximum bandwidth may be reduced (relative to wideband UEs), a single receive radio frequency (RF) chain may be used, peak rate may be reduced (e.g., a maximum of 100 bits for a transport block size), transmit power may be reduced, Rank 1 transmission may be used, and half duplex operation may be performed.

In some cases, if half-duplex operation is performed, MTC UEs may have a relaxed switching time to transition from transmitting to receiving (or receiving to transmitting). For example, the switching time may be relaxed from 20 μs for regular UEs to 1 ms for MTC UEs. Release 12 MTC UEs may still monitor downlink (DL) control channels in the same way as regular UEs, for example, monitoring for wideband control channels in the first few symbols (e.g., PDCCH) as well as narrowband control channels occupying a relatively narrowband, but spanning a length of a subframe (e.g., enhanced PDCCH or ePDCCH).

Certain standards (e.g., LTE Release 13) may introduce support for various additional MTC enhancements, referred to herein as enhanced MTC (or eMTC). For example, eMTC may provide MTC UEs with coverage enhancements up to 15 dB.

Figure 5:
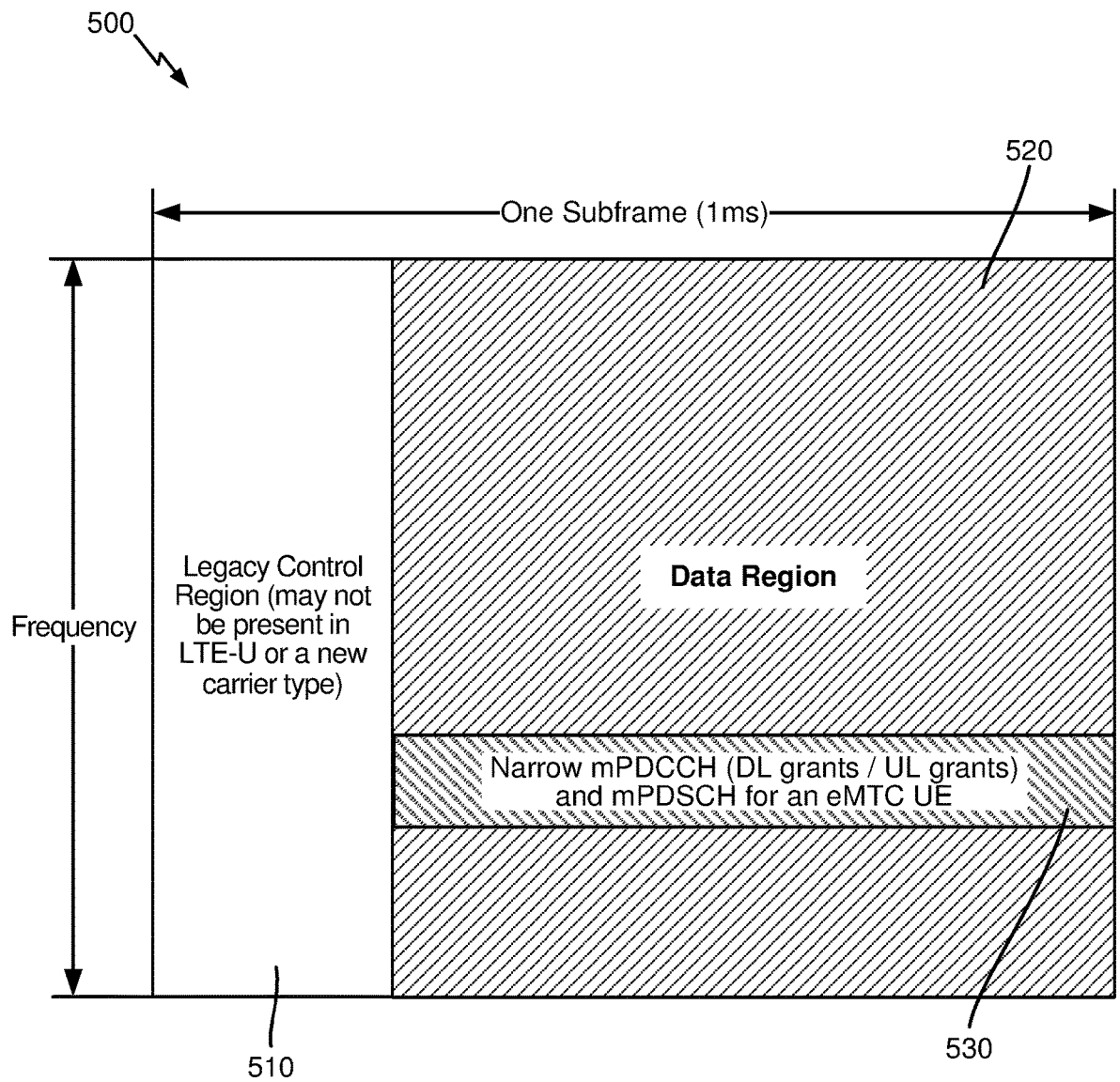
FIG. 5 illustrates an exemplary subframe configuration for enhanced/evolved machine type communications (eMTC), in accordance with certain aspects of the present disclosure.

As illustrated in the subframe structure 500 of FIG. 5, eMTC UEs can support narrowband operation while operating in a wider system bandwidth (e.g., 1.4/3/5/10/15/20 MHz). In the example illustrated in FIG. 5, a conventional legacy control region 510 may span system bandwidth of a first few symbols, while a narrowband region 530 of the system bandwidth (spanning a narrow portion of a data region 520) may be reserved for an MTC physical downlink control channel (referred to herein as an M-PDCCH) and for an MTC physical downlink shared channel (referred to herein as an M-PDSCH). In some cases, an MTC UE monitoring the narrowband region may operate at 1.4 MHz or 6 resource blocks (RBs).

However, as noted above, eMTC UEs may be able to operate in a cell with a bandwidth larger than 6 RBs. Within this larger bandwidth, each eMTC UE may still operate (e.g., monitor/receive/transmit) while abiding by a 6-physical resource block (PRB) constraint. In some cases, different eMTC UEs may be served by different narrowband regions (e.g., with each spanning 6-PRB blocks). As the system bandwidth may span from 1.4 to 20 MHz, or from 6 to 100 RBs, multiple narrowband regions may exist within the larger bandwidth. An eMTC UE may also switch or hop between multiple narrowband regions in order to reduce interference.

Example Narrowband Internet-of-Things

The Internet-of-Things (IoT) may refer to a network of physical objects, devices, or "things". IoT devices may be embedded with, for example, electronics, software, or sensors and may have network connectivity, which enable these devices to collect and exchange data. IoT devices may be sensed and controlled remotely across existing network infrastructure, creating opportunities for more direct integration between the physical world and computer-based systems and resulting in improved efficiency, accuracy, and economic benefit. Systems that include IoT devices augmented with sensors and actuators may be referred to cyber-physical systems. Cyber-physical systems may include technologies such as smart grids, smart homes, intelligent transportation, and/or smart cities. Each "thing" (e.g., IoT device) may be uniquely identifiable through its embedded computing system and may be able to interoperate within existing infrastructure, such as Internet infrastructure.

NB-IoT may refer to a narrowband (NB) radio technology specially designed for the IoT. NB-IoT may focus on indoor coverage, low cost, long battery life, and large number of devices. To reduce the complexity of UEs, NB-IoT may allow for narrowband deployments utilizing one PRB (e.g., 180 kHz+20 kHz guard band). NB-IoT deployments may utilize higher layer components of certain systems (e.g., LTE) and hardware to allow for reduced fragmentation and cross compatibility with, for example, NB-LTE/NB-IoT and/or eMTC.

Figure 6:
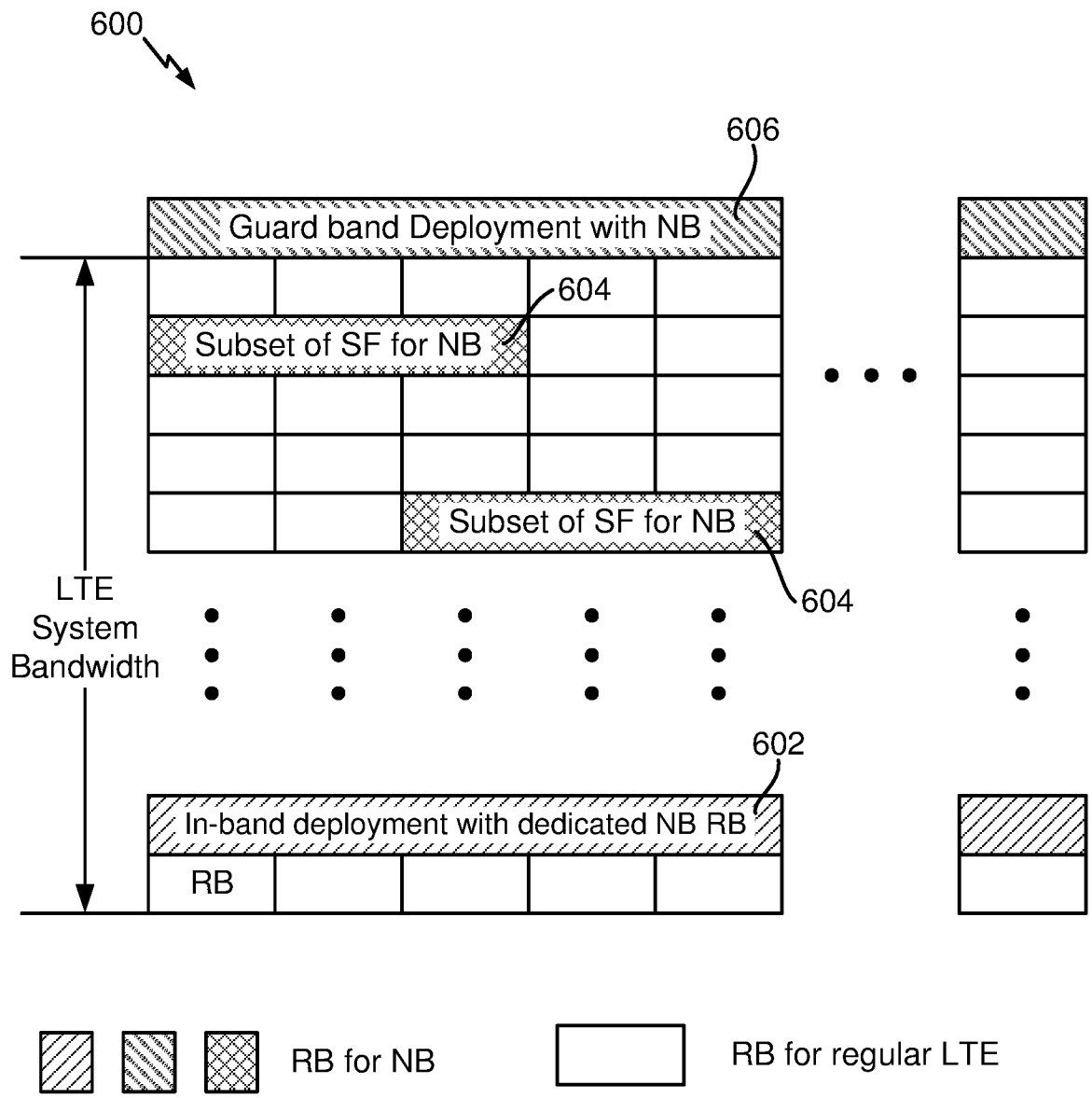
FIG. 6 illustrates an example deployment of narrowband Internet-of-Things (NB-IoT), in accordance with certain aspects of the present disclosure.

FIG. 6 illustrates an example deployment 600 of NB-IoT, according to certain aspects of the present disclosure. Three NB-IoT deployment configurations include in-band, guard-band, and standalone. For the in-band deployment configuration, NB-IoT may coexist with a legacy system (e.g., GSM, WCDMA, and/or LTE system(s)) deployed in the same frequency band. For example, the wideband LTE channel may be deployed in various bandwidths between 1.4 MHz to 20 MHz. As shown in FIG. 6, a dedicated RB 602 within that bandwidth may be available for use by NB-IoT and/or the RBs 1204 may be dynamically allocated for NB-IoT. As shown in FIG. 6, in an in-band deployment, one RB, or 200 kHz, of a wideband channel (e.g., LTE) may be used for NB-IoT.

Certain systems (e.g., LTE) may include unused portions of the radio spectrum between carriers to guard against interference between adjacent carriers. In some deployments, NB-IoT may be deployed in a guard band 606 of the wideband channel.

In other deployments, NB-IoT may be deployed stand-alone (not shown). In a standalone deployment, for example, one 200 MHz carrier may be utilized to carry NB-IoT traffic and GSM spectrum may be reused.

Deployments of NB-IoT may include synchronization signals such as PSS for frequency and timing synchronization and SSS to convey system information. For NB-IoT operations, PSS/SSS timing boundaries may be extended as compared to the existing PSS/SSS frame boundaries in legacy systems (e.g., LTE), for example, from 10 ms to 40 ms. Based on the timing boundary, a UE is able to receive a PBCH transmission, which may be transmitted in subframe 0 of a radio frame.

Example NR/5G RAN Architecture

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a CP on the uplink and downlink and include support for half-duplex operation using TDD. NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC) service.

A single component carrier (CC) bandwidth of 100 MHZ may be supported. NR RBs may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 9 and 10.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units (CUs) or distributed units (DUs).

The NR RAN may include a CU and DUs. A NR BS (e.g., a NB, an eNB, a gNB, a 5G NB, a TRP, an AP, etc.) may correspond to one or multiple BSs. NR cells can be configured as access cells (ACells) or data only cells (DCells). For example, the RAN (e.g., a CU or DU) can configure the cells. DCells may be cells used for carrier aggregation or dual connectivity, but not used for initial access, cell selection/reselection, or handover. In some cases DCells may not transmit synchronization signals—in some case cases DCells may transmit synchronization signals.

Figure 7:
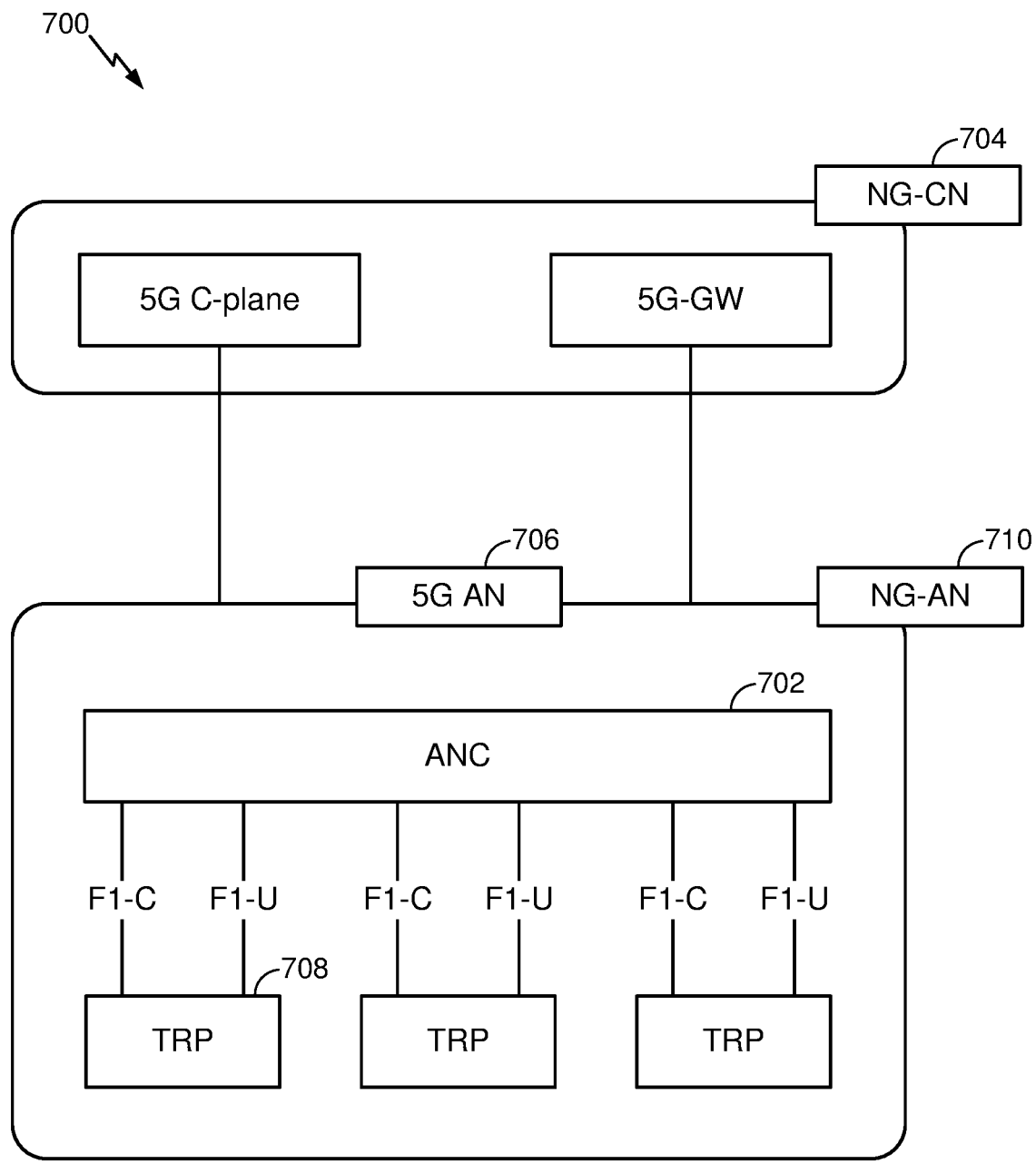
FIG. 7 illustrates an example logical architecture of a distributed radio access network (RAN), in accordance with certain aspects of the present disclosure.

FIG. 7 illustrates an example logical architecture 700 of a distributed RAN, according to aspects of the present disclosure. 5G access node 706 may include access node controller (ANC) 702. ANC 702 may be a CU of the distributed RAN. The backhaul interface to the next generation core network (NG-CN) 704 may terminate at ANC 702. The backhaul interface to neighboring next generation access nodes (NG-ANs) 710 may terminate at ANC 702. ANC 702 may include one or more TRPs 708. As described above, TRP may be used interchangeably with "cell", BS, NR BS, NB, eNB, 5G NB, gNB, AP, etc.

TRPs 708 may comprise a DU. TRPs 708 may be connected to one ANC (e.g., ANC 702) or more than one ANC (not illustrated). For example, for RAN sharing, radio as a service (RaaS), and service specific AND deployments, TRP 708 may be connected to more than one ANC. TRP 708 may include one or more antenna ports. TRPs 708 may be configured to individually (e.g., dynamic selection) or jointly (e.g., joint transmission) serve traffic to a UE.

Logical architecture 700 may be used to illustrate fronthaul definition. The architecture may be defined that support fronthauling solutions across different deployment types. For example, logical architecture 700 may be based on transmit network capabilities (e.g., bandwidth, latency, and/or jitter). Logical architecture 700 may share features and/or components with LTE. According to aspects, NG-AN 710 may support dual connectivity with NR. NG-AN 710 may share a common fronthaul for LTE and NR. Logical architecture 700 may enable cooperation between and among TRPs 708. For example, cooperation may be preset within a TRP and/or across TRPs via ANC 702. In some cases, no inter-TRP interface may be needed/present.

A dynamic configuration of split logical functions may be present within logical architecture 700. The packet data convergence protocol (PDCP), radio link control (RLC), and medium access control (MAC) protocols may be adaptably placed at ANC 702 or TRP 708.

Figure 8:
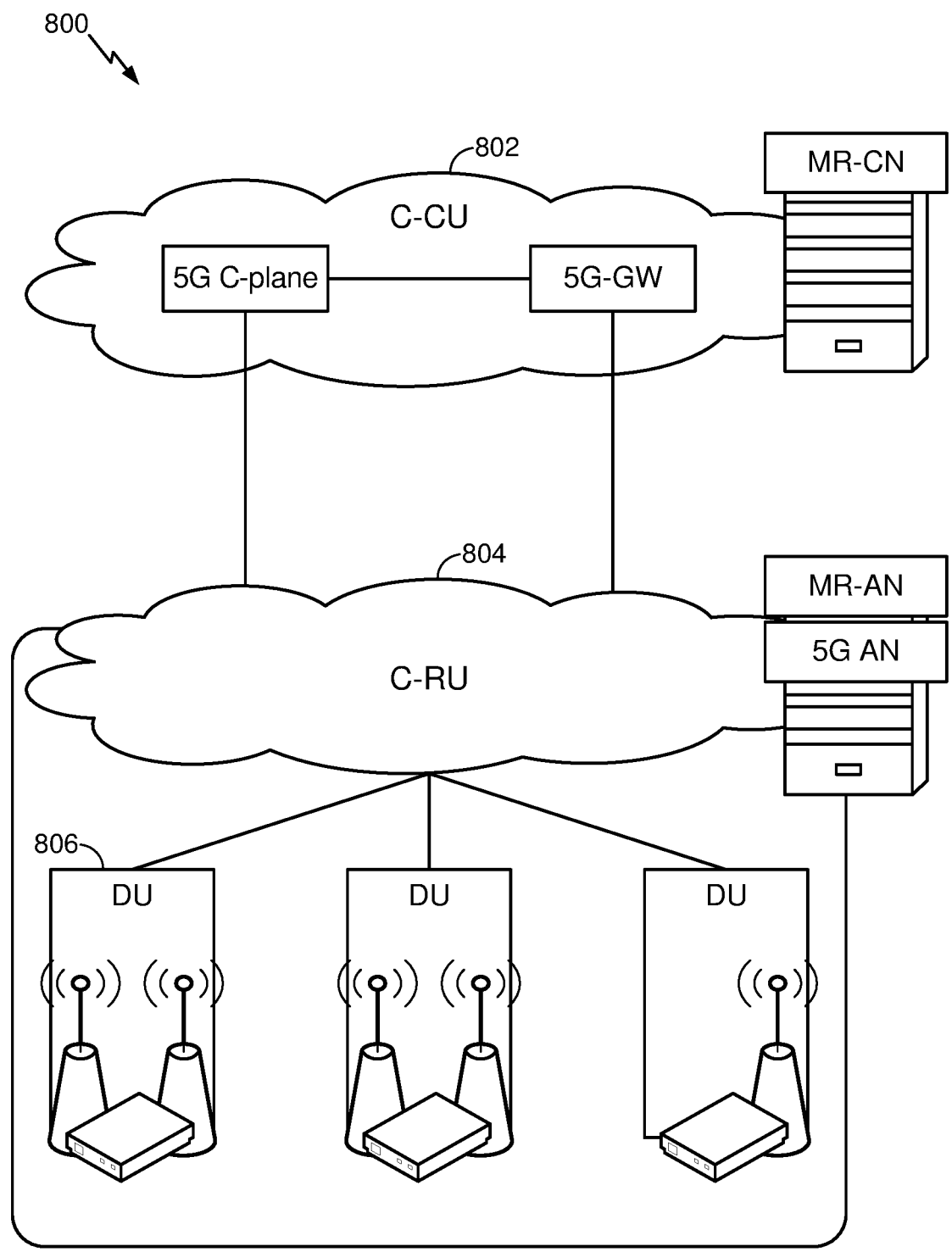
FIG. 8 illustrates an example physical architecture of a distributed RAN, in accordance with certain aspects of the present disclosure.

FIG. 8 illustrates an example physical architecture 800 of a distributed RAN, according to aspects of the present disclosure. Centralized core network unit (C-CU) 802 may host core network functions. C-CU 802 may be centrally deployed. C-CU 802 functionality may be offloaded (e.g., to advanced wireless services (AWS)), in an effort to handle peak capacity.

Centralized RAN unit (C-RU) 804 may host one or more ANC functions. Optionally, C-RU 804 may host core network functions locally. C-RU 804 may have distributed deployment. C-RU 804 may be closer to the network edge.

DU 806 may host one or more TRPs. DU 806 may be located at edges of the network with radio frequency (RF) functionality.

Figure 9:
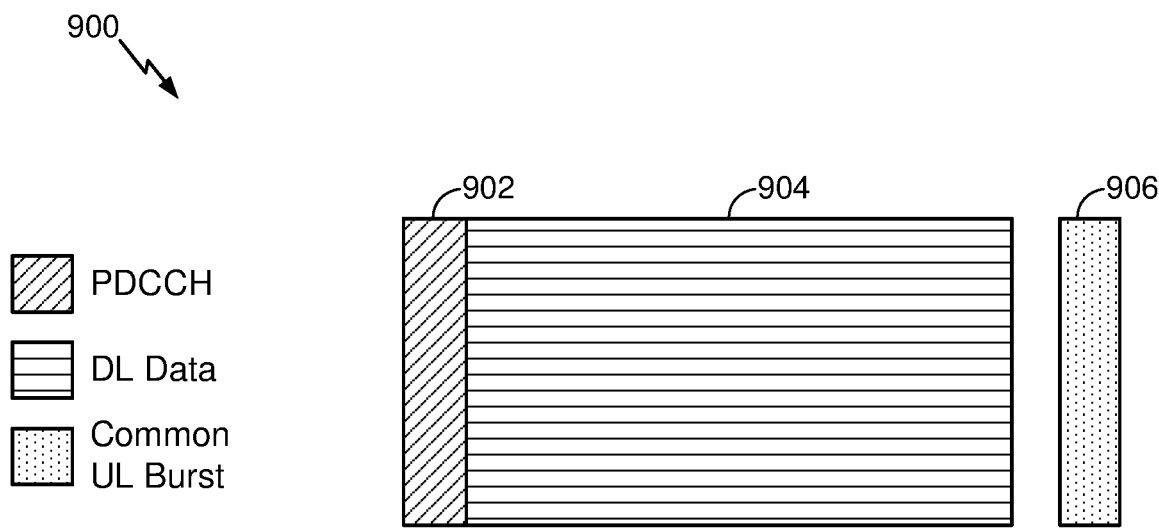
FIG. 9 is a diagram illustrating an example of a downlink (DL)-centric subframe, in accordance with certain aspects of the present disclosure.

FIG. 9 is a diagram showing an example of a DL-centric subframe 900. DL-centric subframe 900 may include control portion 902. Control portion 902 may exist in the initial or beginning portion of DL-centric subframe 900. Control portion 902 may include various scheduling information and/or control information corresponding to various portions of DL-centric subframe 900. In some configurations, control portion 902 may be a physical DL control channel (PDCCH), as shown in FIG. 9. DL-centric subframe 900 may also include DL data portion 904. DL data portion 904 may sometimes be referred to as the payload of DL-centric subframe 900. DL data portion 904 may include the communication resources utilized to communicate DL data from the scheduling entity (e.g., UE or BS) to the subordinate entity (e.g., UE). In some configurations, DL data portion 904 may be a physical DL shared channel (PDSCH).

DL-centric subframe 900 may also include common UL portion 906. Common UL portion 906 may sometimes be referred to as an UL burst, a common UL burst, and/or various other suitable terms. Common UL portion 906 may include feedback information corresponding to various other portions of DL-centric subframe 900. For example, common UL portion 906 may include feedback information corresponding to control portion 902. Non-limiting examples of feedback information may include an acknowledgment (ACK) signal, a negative acknowledgment (NACK) signal, a HARQ indicator, and/or various other suitable types of information. Common UL portion 906 may include additional or alternative information, such as information pertaining to random access channel (RACH) procedures, scheduling requests (SRs), and various other suitable types of information. As illustrated in FIG. 9, the end of DL data portion 904 may be separated in time from the beginning of common UL portion 906. This time separation may sometimes be referred to as a gap, a guard period, a guard interval, and/or various other suitable terms. This separation provides time for the switch-over from DL communication (e.g., reception operation by the subordinate entity) to UL communication (e.g., transmission by the subordinate entity). One of ordinary skill in the art will understand that the foregoing is merely one example of a DL-centric subframe and alternative structures having similar features may exist without necessarily deviating from the aspects described herein.

Figure 10:
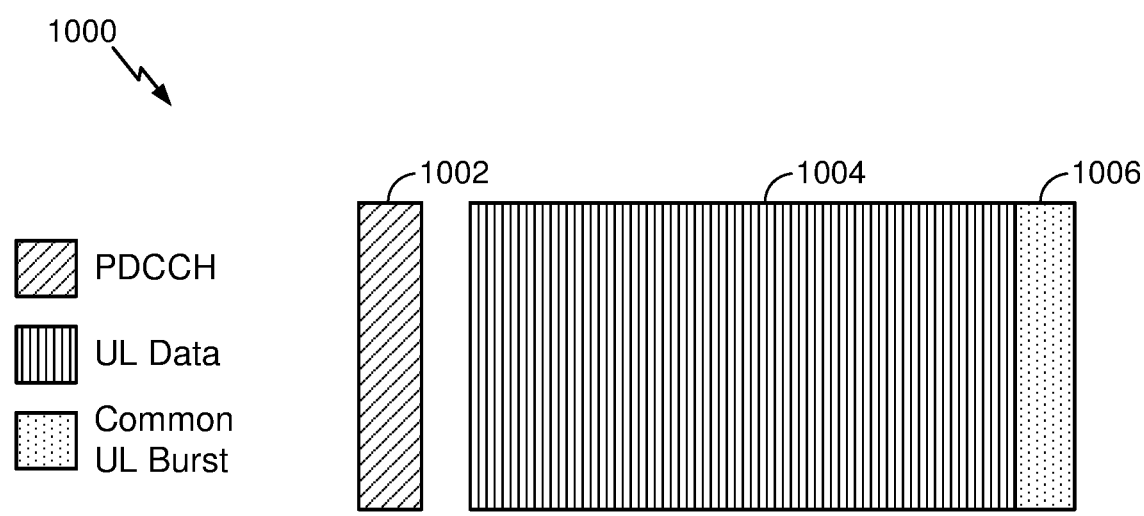
FIG. 10 is a diagram illustrating an example of an uplink (UL)-centric subframe, in accordance with certain aspects of the present disclosure.

FIG. 10 is a diagram showing an example of an UL-centric subframe 1000. UL-centric subframe 1000 may include control portion 1002. Control portion 1002 may exist in the initial or beginning portion of UL-centric subframe 1000. Control portion 1002 in FIG. 10 may be similar to control portion 1002 described above with reference to FIG. 9. UL-centric subframe 1000 may also include UL data portion 1004. UL data portion 1004 may sometimes be referred to as the payload of UL-centric subframe 1000. The UL portion may refer to the communication resources utilized to communicate UL data from the subordinate entity (e.g., UE) to the scheduling entity (e.g., UE or BS). In some configurations, control portion 1002 may be a PDCCH. In some configurations, the data portion may be a physical uplink shared channel (PUSCH).

As illustrated in FIG. 10, the end of control portion 1002 may be separated in time from the beginning of UL data portion 1004. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). UL-centric subframe 1000 may also include common UL portion 1006. Common UL portion 1006 in FIG. 10 may be similar to common UL portion 906 described above with reference to FIG. 9. Common UL portion 1006 may additionally or alternatively include information pertaining to CQI, sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

As mentioned, certain systems (e.g., Release 13 or later eMTC systems) may support narrowband operation. For example, the narrowband operation may include support for communications on a 6 RB band and half-duplex operation (e.g., capability to transmit and receive, but not both simultaneously) for up to, e.g., 15 dB coverage enhancements. These systems may reserve a portion of the system bandwidth for control, which may be an MTC physical downlink control channel (MPDCCH). The MPDCCH may be transmitted in a narrowband, may use at least one subframe, and may rely on demodulation reference signal (DMRS) demodulation for decoding of the control channel. Coverage may be increased by performing repetition/bundling of signals.

Certain systems (e.g., Release 13 or later NB-IoT systems) may support narrowband Internet-of-things operation (NB-IOT). NB-IoT may use 180 kHz bandwidth. NB-IoT may offer standalone, in-band, or guard band deployment scenarios. Standalone deployment may use new bandwidth, whereas guard band deployment may be done using bandwidth typically reserved in the guard band of an existing network, such as long term evolution (LTE). In-band deployment on the other hand may use the same resource blocks in the LTE carrier of the existing LTE network. NB-IoT may offer increased coverage. NB-IoT may define a new narrowband control channel (e.g., Narrowband PDCCH (NPDCCH)), data, and references signals that fit in 1 RB.

Example Periodic Measurement Skipping Technique

Battery-powered devices, such as UEs, may employ a number of power saving techniques to conserve battery power. One of such techniques is microsleep. Microsleep is the type of sleep where components that consume battery power, such as hardware components (e.g., RF components) are put to sleep if small period of inactivity is detected in subframe(s)/slot(s). For example, microsleep may generally be triggered after PDCCH decoding if DCI indicates that there are no more Rx (receive)/Tx (transmit) symbols for a certain duration. Microsleep may generally include two types: (1) light microsleep (LMS)—In this mode few components are put to sleep and this mode may generally be, e.g., 40 μs to 150 μs long; (2) deep microsleep (DMS)—In this mode, more components are put to sleep and this mode may generally be, e.g., 150 μs to 2 ms long.

Measurements of periodic signals (e.g., channel state information-reference signal (CSI-RS), synchronization signal (SS)/PBCH block (SSB)) are measurements that are performed by the UE at regular intervals. Periodic measurements may be statically configured or semi-statically configured. In some instances, microsleep would be enabled otherwise if not for periodic measurements that are scheduled to be performed by the UE. In such instances, periodic measurements and other similar measurements may be skipped for a few resources (e.g., time, frequency, code resources, etc.) if the skipping can enable microsleep. By doing so substantial power may be saved, especially, for example, in cases where an UE indicates low battery or a user selects low power mode. According to an aspect of this disclosure, a priority algorithm in the UE may determine whether to, e.g., opportunistically or dynamically, skip a periodic measurement or not. For example, the UE may make this determination based on whether previous measurement data for reporting may be reused. As another example, the UE may make this determination based on whether fewer measurements can be reported. Other input to the determination process may include battery level or power mode. If the UE needs to be in power saving mode (e.g., due to detected low battery level, user selected low power mode, etc.), then microsleep may be triggered by skipping a number of periodic measurements such as CSI-RS measurements or SSB measurements. As one example, NR may support periodic, semi-persistent, or aperiodic CSI-RS transmission, and periodic, semi-persistent, or aperiodic CSI reporting. Periodic CSI-RS may be configured by higher layers. Semi-persistent and/or aperiodic CSI-RS may be activated and de-activated. Periodic CSI reporting may be configured by higher layer, and the configuration may include at least reporting periodicity and one or more offsets. Periodic CSI reporting may not support dynamic triggering/activation. On the other hand, for semi-persistent and/or aperiodic CSI reporting, the configuration of CSI reporting may be, for example, dynamically activated or de-activated. For example, for periodic or semi-persistent CSI reporting, the following periodicities (measured in slots) may be configured by a higher layer parameter ReportPeriodicity: 5, 10, 20, 40, 80, 160, 320. Relating to CSI-RS transmission and CSI reporting, the following combinations may be supported: (1) for periodic CSI-RS, periodic CSI reporting is supported; semi-persistent CSI reporting may be activated/de-activated by MAC/higher layer and/or DCI; aperiodic CSI reporting may be triggered by DCI; (2) for semi-persistent CSI-RS (semi-persistent CSI-RS/associated measurement may be activated/de-activated by MAC/higher layer and/or DCI), periodic CSI reporting is not supported; semi-persistent CSI reporting may be activated/de-activated by MAC/higher layer and/or DCI; aperiodic CSI reporting may be triggered by DCI; (3) for aperiodic CSI-RS (aperiodic CSI-RS/associated measurement may be activate/de-activated by DCI and/or MAC/higher layer), periodic and semi-persistent CSI reporting are not supported; aperiodic CSI reporting may be triggered by DCI. The techniques disclosed herein may be utilized, for example, at least for periodic CSI-RS and semi-persistent CSI-RS measurements/reporting, and for periodic SSB measurements/reporting. By enabling optimal power consumption, the techniques enable longer battery life and helps user to stay in connected mode longer.

One consideration in determining what type of periodic or semi-persistent measurements to skip is that a network does not base any critical decisions such as handover, cell reselection, etc. on the measurements. CSI-RS and SSB measurements are examples of such measurements. CSI-RS may be applicable to LTE and NR and may be sent, e.g., every 2 ms, by a base station. For NR, CSI-RS may be the only UE-specific reference signal. For example, the following parameters or metrics may be based on/derived from CSI-RS: (1) CQI/PMI (for example, CQI may be mapped to an index based on signal quality metric (e.g., SNR (signal to noise ratio)) measurements using CSI-RS); (2) RSRP measurement (e.g., layer 1 (L1)) that may be used, for example, in NR millimeter wave applications; (3) RSRP/RRM (radio resource management): e.g., layer 3 (L3) for higher layer mobility-related measurements. SSB may be applicable to NR and may be a broadcast channel. SSB may be utilized for base station signal quality measurements, such as L1/L3 RSRP based measurements. In an aspect, when such a measurement is skipped, previous measurements on the same resource may be used for measurement reporting to network. In another aspect, some resources may be skipped from a network report altogether where measurement is not done to enable microsleep.

Figure 11:
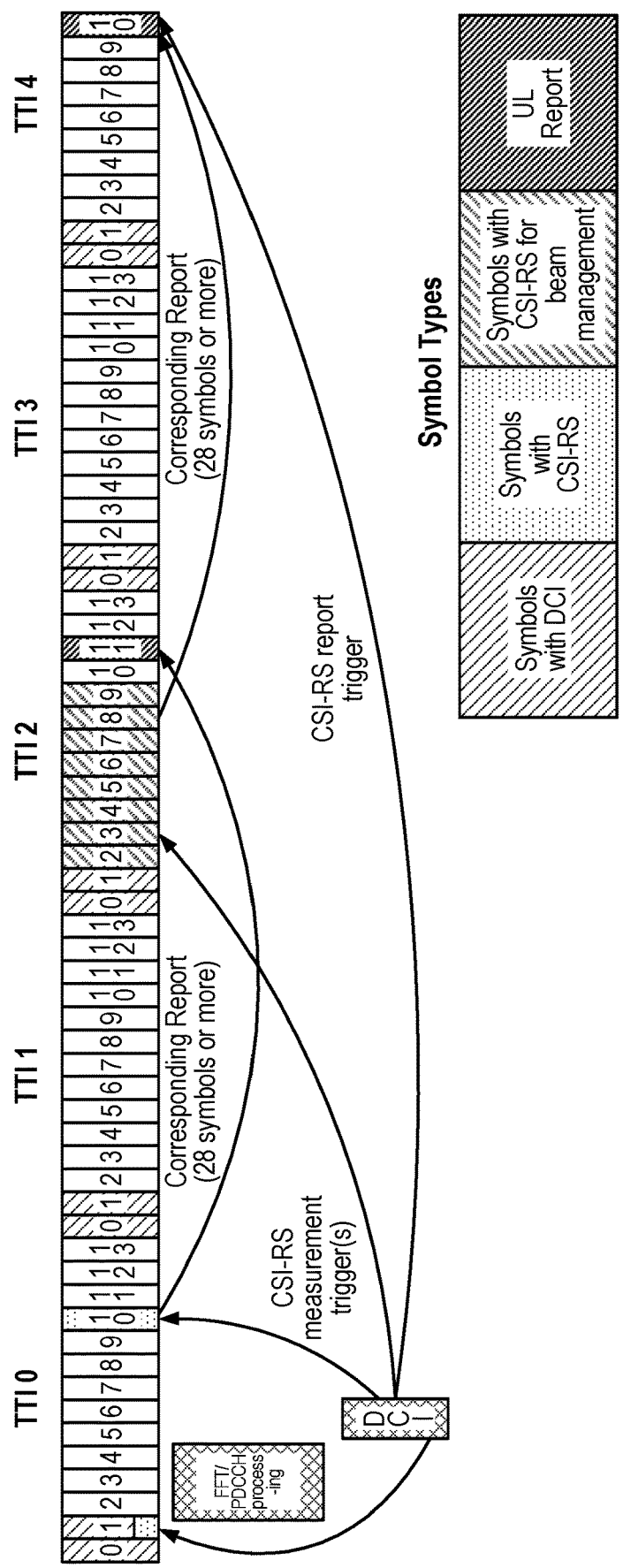
FIG. 11 is a diagram illustrating example timing for channel state information-reference signal (CSI-RS) measurement reports.

FIG. 11 is a diagram illustrating example timing for CSI-RS measurement reports for an UE. The UE (e.g., UE 120) may be a standard or low cost, NB, IoT device, or other device that supports microsleep-type functionalities. In the example of FIG. 11, a TTI interval of 14 symbols with normal cyclic prefix is illustrated. Processing (e.g., operations related to Fast Fourier Transform (FFT)/PDCCH processing) may be performed on symbols with DCI to extract DCI. Aperiodic CSI-RS DCI grant may be on the same TTI as DCI-related activity (e.g., DCI triggered CSI-RS measurement) in the case there is no beam switch involved. If Rx beam switch is possible, the network may send the DCI grant at least 2 TTIs in advance. For periodic, semi-persistent, and/or aperiodic measurements, for example, there may be a minimum of 28 symbols between the last CSI-RS measurement and the UL report. Depending on configuration, measurement reporting may be periodic or aperiodic. In case of periodic measurements and aperiodic reporting, DCI may trigger reports for only the measurements that will take place in the future. According to aspects of the disclosure, microsleep may be triggered more times by skipping CSI-RS or other periodic signal measurements opportunistically (e.g., in low power/low battery case), for example, if earlier measurement can be used for a current or future measurement reporting, or if the network has not requested for measurement reporting corresponding to a certain measurement resource (e.g., where aperiodic reporting is involved). For example, in FIG. 11, even if there is no Rx/Tx scheduled after control channel (e.g., PDCCH, MPDCCH, NPDCCH, NR-PDCCH, etc.) information (e.g., in symbols 0 and 1 according to this example), microsleep (e.g., DMS) cannot be triggered for the rest of TTI 0 as CSI-RS measurement is scheduled later in TTI 0 (in symbol 10 according to this example). This is one of the example scenarios to which techniques in this disclosure may be applied to opportunistically trigger microsleep, thereby conserving battery power. In an aspect, the techniques disclosed herein in reference to CSI-RS may be applied to SSB or another type of signal.

Figure 12:
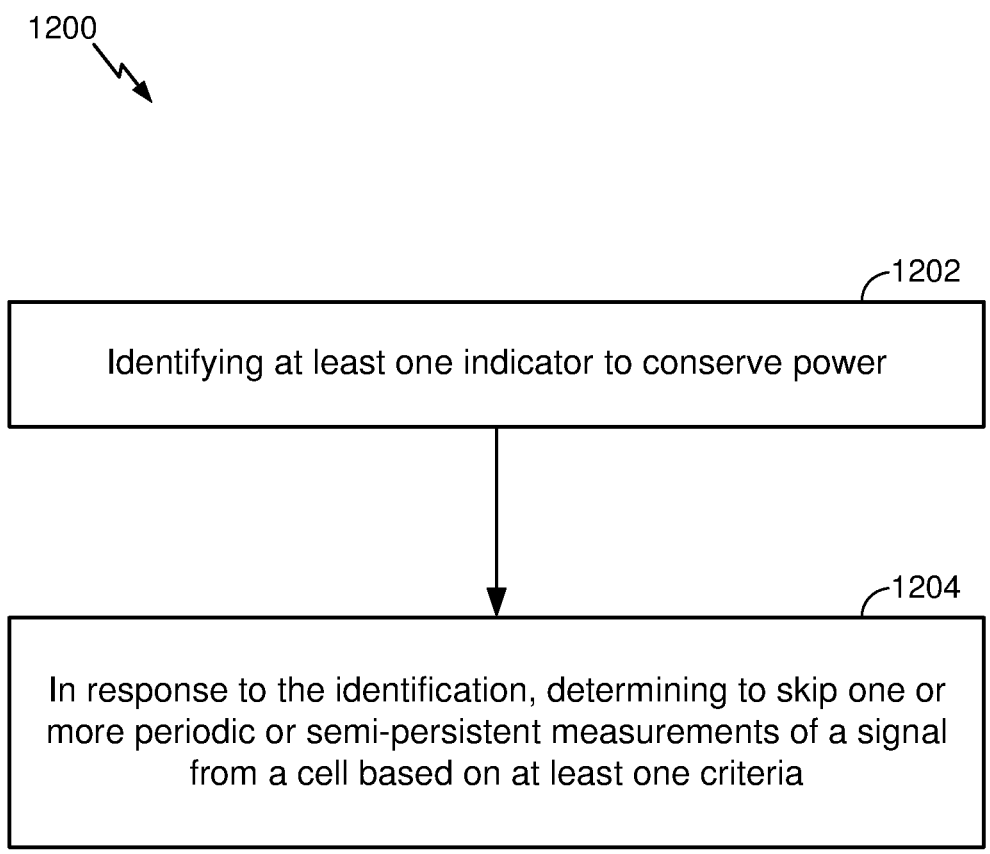
FIG. 12 is a flow diagram illustrating example operations for a UE, in accordance with certain aspects of the present disclosure.

FIG. 12 is a flow diagram illustrating example operations 1200, according to aspects described herein. Operations 1200 may be performed, for example, by a UE (e.g., UE 120) which may be a standard or low cost, NB, IoT device, or other device that supports microsleep-type functionalities. For example, the UE may be an eMTC UE, a NB-IoT UE, or another type of UE. Operations 1200 may be performed by the UE for power management.

Operations 1200 may begin, at 1202, by identifying at least one indicator to conserve power.

In an aspect, indicators to conserve power may be based on one or more of: user input to conserve power (e.g., selecting icon to activate low power mode), L1 indicator for low power mode, UE detection of low battery power level, etc. L1 indicator for low power mode may include a flag/a bit to indicate low power mode. A low battery power level may be determined based on a comparison of a current battery power level with a threshold and a comparison result that the current battery power level is at or below the threshold. The threshold may be pre-determined or dynamically determined based on conditions such as usage patterns, the age of the battery, temperature conditions (e.g., UE internal temperature, surrounding temperature, etc.). In an aspect, upon detecting low battery power level, the UE may indicate an alert to the user (e.g., message, window, vibration, sound, etc.) and may request user input to enter low power mode.

At 1204, in response to the identification, the UE may determine to skip one or more periodic or semi-persistent measurements of a signal from a cell based on at least one criteria.

In an aspect, skipping one or more periodic or semi-persistent measurements of a signal from a cell comprises skipping CSI-RS measurement (4G, 5G, or a future RAT) or SSB measurement (5G, or a future RAT). In an aspect, multiple carriers may each have a corresponding CSI-RS, and the UE may dynamically determine to measure one or more of the CSI-RSs and skip measurement of the rest of the CSI-RSs.

In an aspect, L1/L3 mobility reference signal received power (RSRP) based measurement in 5G may be based on either CSI-RS or SSB. Therefore, RSRP determination may be based on at least one of CSI-RS or SSB. In an aspect, channel quality indicator/indication (CQI) or precoding matrix indicator (PMI) may be based on CSI-RS only.

In an aspect, the at least one criteria based on which the UE determines to skip one or more periodic or semi-persistent measurements may include a determination of whether a previous measurement (e.g., the most recent measurement, an average of the most recent measurements, etc.) may be used for a measurement report. Previous measurements may be accumulated in a database, data structure, or another form of storage (physical or virtual), in the UE or remote from the UE. In one aspect, as more and more measurements accumulate, the earliest measurements may be discarded or deleted to conserve storage capacity. In an aspect, the UE may make such a determination by identifying a signal power or signal quality of received signal of a cell (e.g., the serving cell). For example, if signal power or signal quality is associated with an environment with static/stable channel condition (e.g., low variation among past measurements), one or more previous measurements (e.g., one or more most recent previous measurements) may be reused for a next measurement report. In an aspect, the determination of stable channel condition is based on two or more previous signals received from the cell, where the two or more previous signals have low variation in signal power or signal quality compared to a respective threshold variation level. The threshold variation level may be pre-determined or dynamically determined, e.g., based on current channel conditions or current battery level. In one example, if the current battery level is determined to be low, a threshold variation level value may be set higher relative to a threshold variation level when the battery level is high, so that the probability of reusing a previous measurement (and therefore the probability of skipping a periodic or semi-persistent measurement and entering into microsleep) is higher when the current battery level is low. In another aspect, a UE may base a determination of whether channel condition is stable on Doppler measurement. (e.g., Doppler shift frequency measurements). For example, Doppler shift frequency measurement values below a threshold level may indicate stable channel condition.

In an aspect, the UE may identify a characteristic (e.g., location, time, etc.) of past measurement to determine whether the past measurement may be reused or not. For example, such characteristics may include a location of the UE when the previous measurement was performed (e.g., location relative to a current location of the UE), a time when the previous measurement was performed (e.g., relative to a current time), or combinations thereof. For example, if the location of the UE where a past measurement was performed is determined to be too far from the current location of the UE based on a threshold, the past measurement may not be reused. As another example, if the time at which a past measurement was performed is determined to be too far from the current time based on a threshold, the past measurement may not be reused.

In an aspect, the UE may base a decision on whether to reuse a previous measurement, at least in part, on a signal quality metric, such as SNR, RSRP, RSRQ, RSSI, etc. For example, if the signal quality is high (e.g., when SNR is above a threshold), then the UE may skip measurement and reuse a previous measurement, as the previous measurement may be sufficient for a high signal quality environment. For example, the UE may make this determination based on a signal quality metric (e.g., SNR) of signals received from the cell being over or equal to a first threshold. In another aspect, if the signal quality metric is below or equal to a second threshold, where the second threshold is lower than the first threshold, the UE may determine to perform one or more periodic or semi-persistent measurements. In another aspect, the techniques disclosed herein may be combined depending on application. For example, a combination or weighted average of different criteria may be used. For example, the least one criteria, based on which the UE determines to skip one or more periodic or semi-persistent measurements of a signal from a cell, includes a combination or a weighted average of at least two criteria, such as signal quality metric, location of a past measurement, time of a past measurement, or variation in signal power or signal quality of two or more previously measured signals, etc.

In an aspect, the UE may determine to skip one or more periodic or semi-persistent measurements by performing the periodic or semi-persistent measurements with less frequency. In another aspect, the techniques described herein may be applicable to standard UEs or bandwidth limited UEs. For example, a standard UE may be considered a UE of first type, and a bandwidth limited UE may be considered a UE of a second type, where the second type of UE operates on a reduced bandwidth relative the first type of UE. In an aspect, the second type of UE may be an enhanced machine-type communication (eMTC) UE or an NB-IoT UE. Battery power conservation may be a major consideration for UEs, and techniques disclosed may reduce battery power consumption for UEs, including IoT UEs, such as eMTC UEs or NB-IoT UEs, which may need to operate on battery power for a number of years without charging or replacing the battery. In another aspect, the cell may be a primary cell or secondary cell(s), as CSI-RS measurement is applicable to both primary cell or secondary cell(s). In an aspect, in response to the determination to skip the one or more periodic or semi-persistent measurements of the signal, the UE may enter into microsleep. In another aspect, the cell and the UE may support one or more wireless communication technologies, such as LTE and 5G.

As used herein, the terms "identify" or "determine" encompass a wide variety of actions. For example, "identifying" or "determining" may include calculating, computing, processing, deriving, investigating, looking up (e.g., looking up in a table, a database or another data structure), ascertaining and the like. Also, "identifying" or "determining" may include receiving (e.g., receiving information), accessing (e.g., accessing data in a memory) and the like. Also, "identifying" or "determining" may include resolving, selecting, choosing, establishing and the like.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. As used herein, reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. A phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In some cases, rather than actually communicating a slot/subframe/frame, a device may have an interface to communicate a slot/subframe/frame for transmission or reception. For example, a processor may output a slot/subframe/frame, via a bus interface, to an RF front end for transmission. Similarly, rather than actually receiving a slot/subframe/frame, a device may have an interface to obtain a slot/subframe/frame received from another device. For example, a processor may obtain (or receive) a slot/subframe/frame, via a bus interface, from an RF front end for transmission.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in Figures, those operations may be performed by any suitable corresponding counterpart means-plus-function components.

For example, means for identifying, means for determining, means for entering, means for causing, means for attempting, means for measuring, means for using, means for selecting, means for transmitting, means for receiving, means for sending, means for comparing, means for repeating, means for increasing, and/or means for decreasing may include one or more processors/controllers, transmitters, receivers, antennas, and/or other elements of the user equipment 120 and/or the base station 110 illustrated in FIG. 2.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as hardware, software, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. One or more aforementioned devices or processors may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination thereof. A software module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, or combinations thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for power management by a user equipment (UE), comprising:
   receiving at least one signal from a cell;
   identifying at least one indicator to conserve power; and
   in response to the identifying:
      determining to use a previous measurement for a measurement report and to skip one or more periodic or one or more semi-persistent measurements of the at least one signal, when a signal quality metric of signals, received from the cell, is over or equal to a first threshold;
      determining to perform the one or more periodic or the one or more semi-persistent measurements of the at least one signal when the signal quality metric is below or equal to a second threshold, the second threshold lower than the first threshold; and
      in response to the determining to use a previous measurement, entering into microsleep.

2. The method of claim 1, wherein the at least one indicator to conserve power comprises at least one of: user input to conserve power, layer 1 (L1) indicator for the low power mode, or a determination that a UE power level is below a threshold.

3. The method of claim 1, wherein the one or more periodic or semi-persistent measurements comprise at least one of: channel state information-reference signal (CSI-RS) measurement, or synchronization signal (SS)/PBCH (physical broadcast channel) block (SSB) measurement.

4. The method of claim 3, wherein a reference signal received power (RSRP) determination is based on at least one of the CSI-RS measurement or the SSB measurement.

5. The method of claim 3, wherein a channel quality indicator (CQI) or a precoding matrix indicator (PMI) is based on the CSI-RS measurement.

6. The method of claim 1, wherein the determining to use a previous measurement is based on two or more previous signals received from the cell, wherein the two or more previous signals have lower or equal variation in signal power or signal quality compared to a respective threshold variation level.

7. The method of claim 1, wherein the determining to use a previous measurement is based on Doppler shift frequency measurement values, and wherein the Doppler shift frequency measurement values below a threshold level indicate stable channel condition.

8. The method of claim 1, wherein the determining to use a previous measurement is based on at least one of: a location of the UE when the previous measurement was performed, relative to a current location of the UE, or a time when the previous measurement was performed, relative to a current time.

9. The method of claim 1, wherein the signal quality metric comprises a combination or a weighted average of at least two criteria.

10. The method of claim 1, wherein the determining to skip one or more periodic or one or more semi-persistent measurements comprises performing the one or more periodic or the one or more semi-persistent measurements with less frequency.

11. An apparatus for power management by a user equipment (UE), comprising:
    at least one processor; and
    memory coupled to the at least one processor, the memory including instructions executable by the at least one processor to cause the UE to:
       receive, while not in low power mode, at least one signal from a cell;
       identify at least one indicator to conserve power; and
       in response to the identifying;
          determine to use a previous measurement for a measurement report and to skip one or more periodic or one or more semi-persistent measurements of the at least one signal, when a signal quality metric of signals, received from the cell, is over or equal to a first threshold;
          determine to perform the one or more periodic or the one or more semi-persistent measurements of the at least one signal when the signal quality metric is below or equal to a second threshold, the second threshold lower than the first threshold; and
          in response to the determining to use a previous measurement, enter into microsleep.

12. The apparatus of claim 11, wherein the at least one indicator to conserve power comprises at least one of: user input to conserve power, layer 1 (L1) indicator for the low power mode, or a determination that a UE power level is below a threshold.

13. The apparatus of claim 11, wherein the one or more periodic or semi-persistent measurements comprise at least one of: channel state information-reference signal (CSI-RS) measurement, or synchronization signal (SS)/PBCH (physical broadcast channel) block (SSB) measurement.

14. The apparatus of claim 13, wherein a reference signal received power (RSRP) determination is based on at least one of the CSI-RS measurement or the SSB measurement.

15. The apparatus of claim 13, wherein a channel quality indicator (CQI) or a precoding matrix indicator (PMI) is based on the CSI-RS measurement.

16. The apparatus of claim 11, wherein the determining to use a previous measurement is based on two or more previous signals received from the cell, wherein the two or more previous signals have lower or equal variation in signal power or signal quality compared to a respective threshold variation level.

17. The apparatus of claim 11, wherein the determining to use a previous measurement is based on Doppler shift frequency measurement values, and wherein the Doppler shift frequency measurement values below a threshold level indicate stable channel condition.

18. The apparatus of claim 11, wherein the determining to use a previous measurement is based on at least one of: a location of the UE when the previous measurement was performed, relative to a current location of the UE, or a time when the previous measurement was performed, relative to a current time.

19. The apparatus of claim 11, wherein the signal quality metric comprises a combination or a weighted average of at least two criteria.

20. The apparatus of claim 11, wherein the determining to skip one or more periodic or one or more semi-persistent measurements comprises performing the one or more periodic or the one or more semi-persistent measurements with less frequency.

21. An apparatus for power management by a user equipment (UE), comprising:
    means for receiving at least one signal from a cell;
    means for identifying at least one indicator to conserve power; and
    means for, in response to the identifying:

determining to use a previous measurement for a measurement report and to skip one or more periodic or one or more semi-persistent measurements of the at least one signal, when a signal quality metric of signals, received from the cell, is over or equal to a first threshold;

determining to perform the one or more periodic or the one or more semi-persistent measurements of the at least one signal when the signal quality metric is below or equal to a second threshold, the second threshold lower than the first threshold; and in response to the determining to use a previous measurement entering into microsleep.

22. A non-transitory computer-readable medium for power management by a user equipment (UE), the non-transitory computer-readable medium comprising code, which when executed by at least one processor, causes the UE to:

receive at least one signal from a cell;
identify at least one indicator to conserve power; and
in response to the identifying:
  determine to use a previous measurement for a measurement report and to skip one or more periodic or one or more semi-persistent measurements of the at least one signal, when a signal quality metric of signals, received from the cell, is over or equal to a first threshold;
  determine to perform the one or more periodic or the one or more semi-persistent measurements of the at least one signal when the signal quality metric is below or equal to a second threshold, the second threshold lower than the first threshold; and
  in response to the determining to use a previous measurement, enter into microsleep.

\* \* \* \* \*